US012620834B2

(12) United States Patent
Wang et al.

(10) Patent No.: US 12,620,834 B2
(45) Date of Patent: May 5, 2026

(54) WIRELESS CHARGING WITH SPLIT RESONANT CAPACITORS

(71) Applicant: Google LLC, Mountain View, CA (US)

(72) Inventors: Li Wang, Mountain View, CA (US);
Liang Jia, Mountain View, CA (US);
Liyu Yang, Mountain View, CA (US);
Stefano Saggini, Udine (IT)

(73) Assignee: Google LLC, Mountain View, CA (US)

( * ) Notice: Subject to any disclaimer, the term of this patent is extended or adjusted under 35 U.S.C. 154(b) by 717 days.

(21) Appl. No.: 17/996,736

(22) PCT Filed: Aug. 10, 2021

(86) PCT No.: PCT/US2021/045318
§ 371 (c)(1),
(2) Date: Oct. 20, 2022

(87) PCT Pub. No.: WO2023/018409
PCT Pub. Date: Feb. 16, 2023

(65) Prior Publication Data
US 2024/0223012 A1     Jul. 4, 2024

(51) Int. Cl.
*H02J 7/00*     (2026.01)
*H02J 50/12*     (2016.01)
*H02J 50/40*     (2016.01)
(52) U.S. Cl.
CPC ............ *H02J 50/12* (2016.02); *H02J 50/402* (2020.01)
(58) Field of Classification Search
None
See application file for complete search history.

(56) References Cited

U.S. PATENT DOCUMENTS

| | | | |
|---|---|---|---|
| 7,429,899 B2 | 9/2008 | Gabara | |
| 8,742,625 B2 | 6/2014 | Baarman et al. | |
| 9,231,411 B2* | 1/2016 | Baarman | H02J 50/402 |
| 9,954,375 B2 | 4/2018 | McCauley et al. | |
| 10,116,169 B2 | 10/2018 | Cho et al. | |
| 10,210,994 B2 | 2/2019 | Nam | |
| 10,236,119 B2 | 3/2019 | Davila et al. | |
| 10,483,786 B2 | 11/2019 | Moussaoui et al. | |
| 2016/0189848 A1 | 6/2016 | Nam | |

(Continued)

FOREIGN PATENT DOCUMENTS

| | | |
|---|---|---|
| KR | 20100136206 A | 12/2010 |
| KR | 20160078186 A | 7/2016 |
| KR | 20170037411 A | 4/2017 |

(Continued)

OTHER PUBLICATIONS

International Search Report and Written Opinion of International Application No. PCT/US2021/045318, dated Apr. 28, 2022, 11 pp.

(Continued)

*Primary Examiner* — Arun C Williams
(74) *Attorney, Agent, or Firm* — Shumaker & Sieffert, P.A.

(57) ABSTRACT

An example device includes a plurality of capacitor and wireless charging coil series pairs that are collectively in parallel; and one or both of: a driver circuit configured to drive the plurality of capacitor and wireless charging coil series pairs with a first common signal; or a sink circuit configured to receive a second common signal from the plurality of capacitor and wireless charging coil series pairs.

9 Claims, 11 Drawing Sheets

(56) References Cited

U.S. PATENT DOCUMENTS

2017/0093217 A1* 3/2017 Cho ........................ H02J 50/12

FOREIGN PATENT DOCUMENTS

| KR | 20190006592 A | 1/2019 |
| WO | 2011129347 A1 | 10/2011 |
| WO | 2020069198 A1 | 4/2020 |

OTHER PUBLICATIONS

First Office Action and Search Report, and translation thereof, from counterpart Korean Application No. 10-2024-7006445 dated Apr. 23, 2025, 100 pp.

Response to Communication Pursuant to Rules 161(1) and 162 EPC dated Feb. 16, 2022, from counterpart European Application No. 21762958.3, filed Jul. 26, 2024, 12 pp.

Response to Office Action, and translation thereof, dated Apr. 23, 2025, from counterpart Korean Application No. 10-2024-7006445 filed Jun. 17, 2025, 38 pp.

Office Action from counterpart Korean Application No. 10-2024-7006445 dated Dec. 26, 2025, 8 pp. Translation Attached.

Response to Office Action dated Dec. 26, 2025, from counterpart Korean Application No. 10-2024-7006445 filed Mar. 16, 2026, 30 pp. Machine translation provided.

* cited by examiner

Time
(uSecs)

Time
(uSecs)

WIRELESS CHARGING WITH SPLIT RESONANT CAPACITORS

BACKGROUND

Computing devices, such as smartphones, laptops, wearable devices, and tablets, may include wireless charging capabilities. Computing devices may operate as wireless charging source devices that wirelessly provide power or wireless charging sink devices that wirelessly receive power. For instance, a wireless charging sink device may include a receiver coil and other components capable of transducing a magnetic field into an electrical power signal that may be used to charge a battery of the computing device or otherwise operate components of the computing device. Similarly, a wireless charging source device may include a power supply that output a signal to a transmitter coil that causes the transmitter coil to generate a magnetic field. A controller of the wireless charging source device may adjust operation of the power supply to control an amount of power provided and/or properties of the electrical power signal at the wireless charging receive device.

SUMMARY

This disclosure generally relates to wireless charging devices that include split resonant capacitors. A wireless charging device may include a resonant tank that includes one or more resonant capacitors and one or more coils that transduce energy between magnetic fields and alternating current (AC) power signals. In some examples, the resonant capacitors may all be electrically in parallel and the coils may all be in parallel, with the parallel capacitors being in series with the parallel coils (i.e., such that all current flows through a single node between the capacitors and the coils). However, such an arrangement may yield various disadvantages. For instance, eddy current losses may be a large loss contributor in wireless charging systems.

In accordance with one or more aspects of this disclosure, a wireless charging device may include a plurality of capacitor and wireless charging coil series pairs that are collectively in parallel. For instance, the collection of capacitor and wireless charging coil series pairs may all share a common input node and a common output node. By including the plurality of capacitor and wireless charging coil series pairs, eddy current losses may be reduced. In this way, wireless charging efficiency may be improved.

As one example, a device includes a plurality of capacitor and wireless charging coil series pairs that are collectively in parallel; and a driver circuit configured to drive the plurality of capacitor and wireless charging coil series pairs with a common signal.

As another example, a system includes a wireless charging source device; and a wireless charging sink device, wherein the wireless charging source device is configured to wirelessly charge the wireless charging sink device, and wherein the wireless charging source device comprises: a plurality of capacitor and wireless charging coil series pairs that are collectively in parallel; and a driver circuit configured to drive the plurality of capacitor and wireless charging coil series pairs with a common signal.

As another example, a system includes a wireless charging source device; and a wireless charging sink device, wherein the wireless charging source device is configured to wirelessly charge the wireless charging sink device, and wherein the wireless charging sink device comprises: a plurality of capacitor and wireless charging coil series pairs that are collectively in parallel; and a driver circuit configured to drive the plurality of capacitor and wireless charging coil series pairs with a common signal.

The details of one or more examples are set forth in the accompanying drawings and the description below. Other features, objects, and advantages will be apparent from the description and drawings, and from the claims.

DETAILED DESCRIPTION

Figure 1:
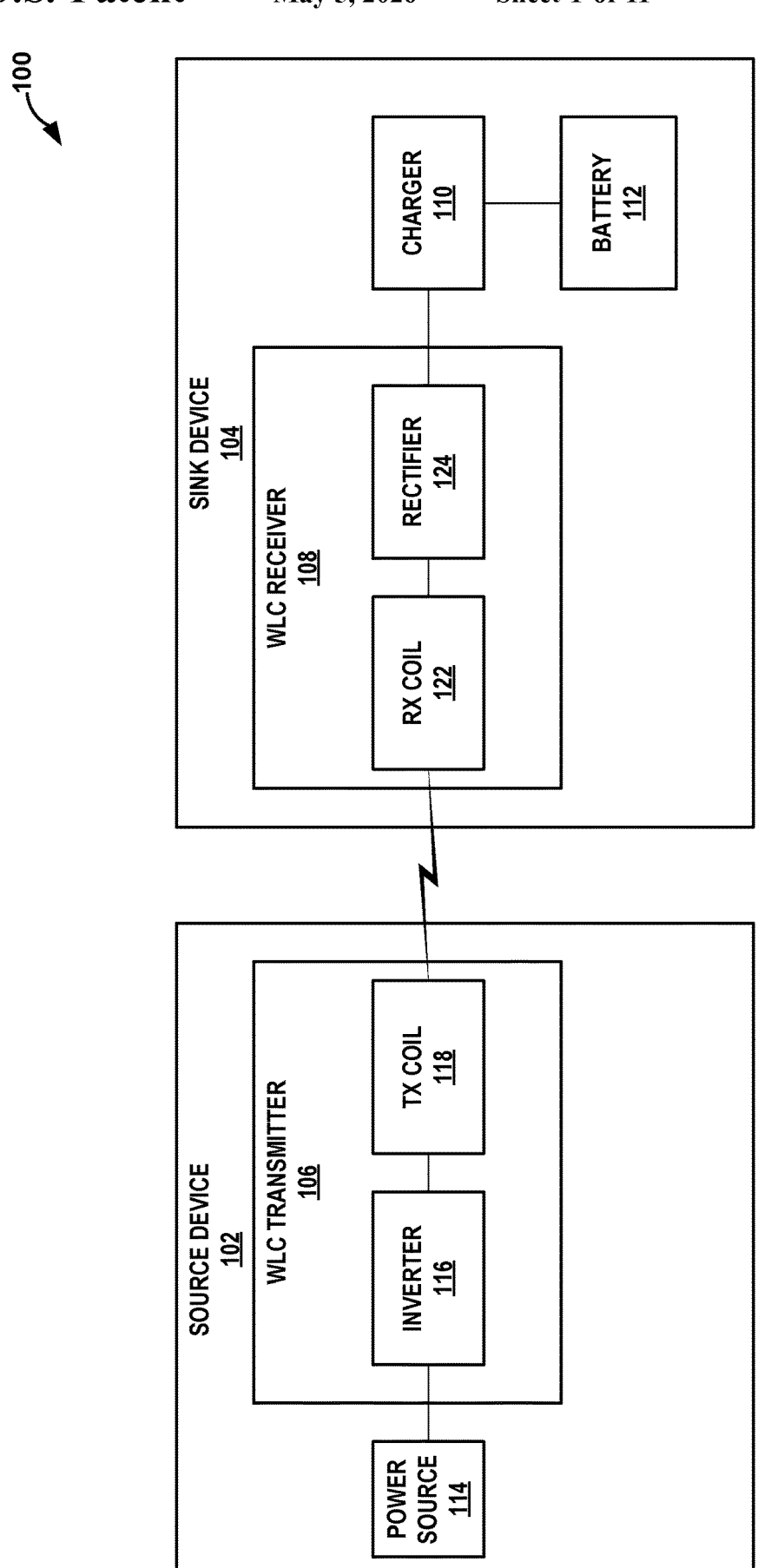
FIG. 1 is a block diagram illustrating a system that includes a wireless charging source device and a wireless charging sink device, at least one of which includes a plurality of capacitor and wireless charging coil series pairs that are collectively in parallel, in accordance with one or more aspects of this disclosure.

FIG. 1 is a block diagram illustrating a system that includes a wireless charging source device and a wireless charging sink device, at least one of which includes a plurality of capacitor and wireless charging coil series pairs that are collectively in parallel, in accordance with one or more aspects of this disclosure. As shown in FIG. 1, system 100 may include wireless charging source device 102 ("source device 102") and wireless charging sink device 104 ("sink device 104").

Source device 102 may be any type of device that wirelessly provides power to another device. Examples of source device 102 include, but are not limited to, a charging pad, an alarm clock, a power bank, a mobile phone, a camera device, a tablet computer, a smart display, a laptop computer, a desktop computer, a gaming system, a media player, an e-book reader, a television platform, a vehicle infotainment system or head unit, a vehicle surface with integrated charging, or a wearable computing device (e.g., a computerized watch, a head mounted device such as a VR/AR headset, computerized eyewear, a computerized glove). As shown in FIG. 1, source device 102 may include wireless charging (WLC) transmitter 106 and power source 114.

Power source 114 may be any component capable of providing electrical power to other components of source device 102. Examples of power source 114 include, but are not limited to, batteries, solar panels, wall adapters, wireless charging receive coils, etc. As shown in FIG. 1, power source 114 may provide electrical power (e.g., direct current (DC) electrical power) to WLC transmitter 106.

WLC transmitter 106 may be configured to wirelessly provide power to another device. In some examples, WLC transmitter 106 may be compliant with (e.g., operate in accordance with) a wireless charging standard such as the Qi specification published by the Wireless Power Consortium (e.g., available at wirelesspowerconsortium.com/knowl-edge-base/specifications/download-the-qi-specification-s.html). As shown in FIG. 1, WLC transmitter 106 may include inverter 116, transmitter (Tx) coil 118, and controller 120.

Inverter 116 may be configured to convert a direct current (DC) signal into an alternating current (AC) signal. For instance, inverter 116 may convert a DC power signal received from power source 114 into an AC power signal, and provide the AC power signal to Tx coil 118. In some examples, inverter 116 may be an active full bridge inverter that includes a plurality of switches. Operation of the plurality of switches may be controlled by a controller.

Tx coil 118 may be configured to generate a magnetic field proportional to a power signal flowing through Tx coil 118. For instance, Tx coil 118 may generate a magnetic field having properties proportional to the AC power signal output to Tx coil 118 from inverter 116.

Sink device 104 may be any type of device that operates at least in part using power wirelessly received from another device. Examples of sink device 104 include, but are not limited to, a power bank, a mobile phone, a camera device, a tablet computer, a smart display, a laptop computer, a desktop computer, a gaming system, a media player, an e-book reader, a television platform, or a wearable computing device. As shown in FIG. 1, sink device 104 may include wireless charging (WLC) receiver 108, charger 110, and battery 112.

WLC receiver 108 may be configured to wirelessly receive power from another device. In some examples, WLC receiver 108 may be compliant with (e.g., operate in accordance with) a wireless charging standard such as the Qi specification published by the Wireless Power Consortium (e.g., available at wirelesspowerconsortium.com/knowl-edge-base/specifications/download-the-qi-specification-s.html). As shown in FIG. 1, WLC receiver 108 may include receiver (Rx) coil 122, and rectifier 124.

Rx coil 122 may be configured to transduce a magnetic field into a power signal. For instance, Rx coil 122 may transduce the magnetic field generated by Tx coil 118 into an AC power signal having properties proportional to the magnetic field (e.g., and thus proportional to AC power signal output to Tx coil 118 from inverter 116). Rx coil 122 may output the transduced AC power signal to one or more components of WLC receiver 108, such as rectifier 124.

Rectifier 124 may be configured to convert an AC signal into a DC signal. For instance, rectifier 124 may convert an AC power signal received from Rx coil 122 into a DC power signal, and provide the DC power signal to another component of sink device 104, such as charger 110. In some examples, rectifier 124 may be an active full bridge rectifier that includes a plurality of switches. In this sense, rectifier 124 may be considered to be an active rectifier (e.g., as opposed to a bridge formed entirely of passive diodes). Operation of the plurality of switches may be controlled by a controller. In other examples, rectifier 124 may be a passive rectifier.

Components of sink device 104 may utilize the DC power signal output by WLC receiver 108 to perform various operations. For instance, charger 110 may utilize the DC power signal output by WLC receiver 108 to charge battery 112.

Various losses may occur during wireless charging. These losses may reduce the efficiency of the wireless charging process. For instance, while power source 114 may provide X watts of power, charger 110 may only receive Y watts of power where Y is less than X. In general, it may be desirable to minimize wireless charging losses (i.e., to improve charging efficiency). One of the largest losses may be eddy current losses. For instance, up to 30% of the losses in wireless charging may be eddy current losses.

In accordance with one or more aspects of this disclosure, one or both of TX coil 118 and/or RX coil 122 may include a plurality of capacitor and wireless charging coil series pairs that are collectively in parallel. The pairs of coils and capacitors may each be referred to as a resonant tank. For instance, each resonant tank may include one or more capacitors and one or more coils. The configuration that includes the plurality of capacitor and wireless charging coil series pairs that are collectively in parallel may be referred to as a split resonant capacitor configuration. In contrast, a configuration that includes a plurality of capacitors electrically in parallel and a plurality of coils electrically in parallel, with the parallel capacitors being electrically in series with the parallel coils, may be referred to as a non-split resonant capacitor configuration.

Source device 102 may include a driver circuit configured to drive the plurality of capacitor and wireless charging coil series pairs with a common signal. For instance, in the example of FIG. 1, the driver circuit may be represented by power source 114 and inverter 116. By driving the plurality of capacitor and wireless charging coil series pairs with the common signal, the driver circuit may output the common signal across a common input node and a common output node. The plurality of capacitor and wireless charging coil series pairs may be collectively in parallel between the common input node and the common output node.

The split resonant capacitor configuration may provide various advantages (e.g., as opposed to the non-split resonant capacitor configuration). For instance, there may be lower eddy currents in each of the capacitor/coil pairs in the split resonant capacitor configuration (e.g., as a result of better AC current sharing between capacitor/coil pairs). The lower eddy currents may result in a reduction in eddy current losses, which may desirably improve wireless charging efficiency. These benefits may still be achieved with a same quantity of coils and capacitors as the non-split resonant capacitor configuration.

Figure 2:
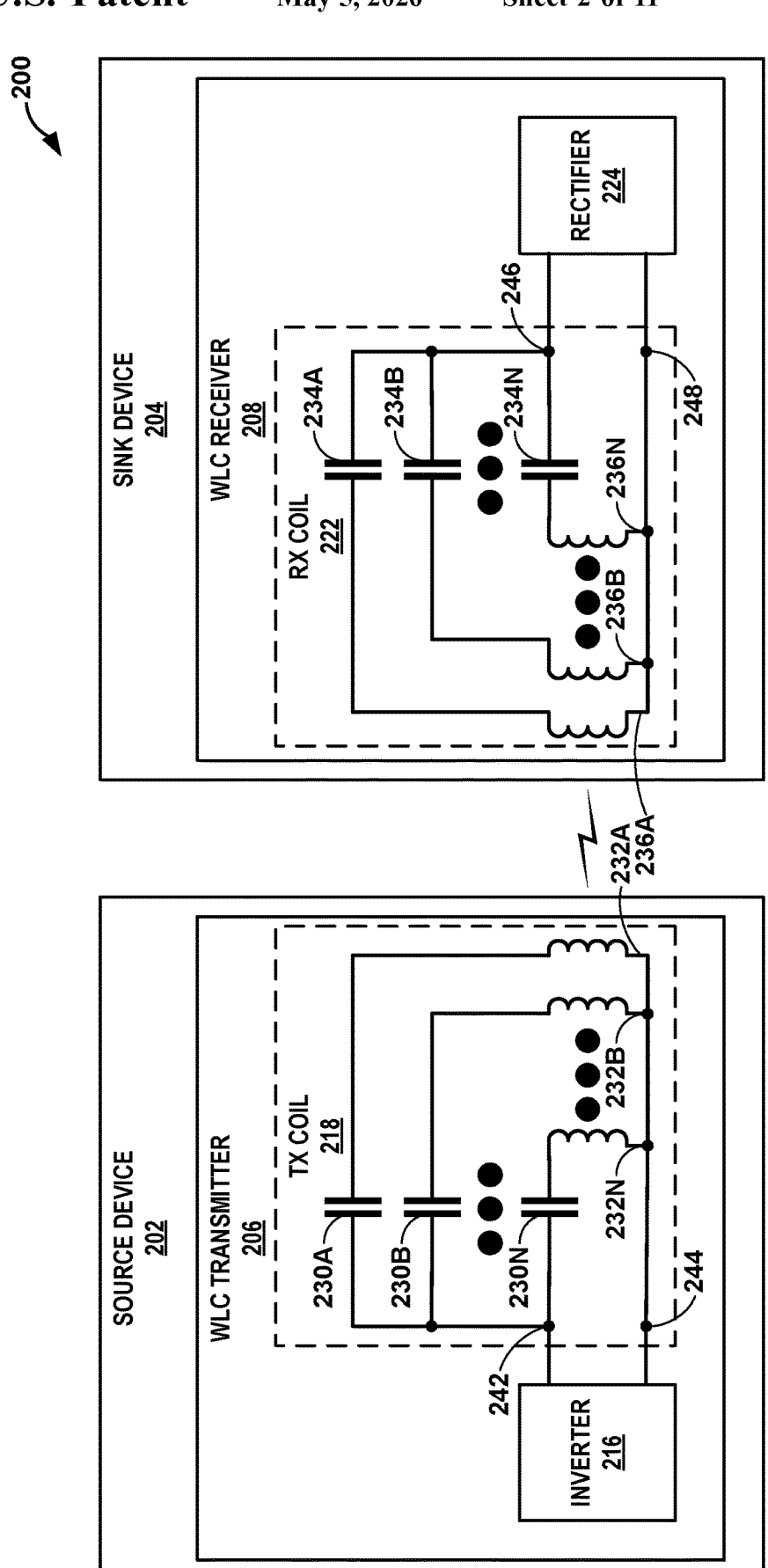
FIG. 2 is a schematic diagram illustrating a system that includes a wireless charging source device and a wireless charging sink device, at least one of which includes a split resonant capacitor configuration, in accordance with one or more aspects of this disclosure.

FIG. 2 is a schematic diagram illustrating a system that includes a wireless charging source device and a wireless charging sink device, at least one of which includes a split resonant capacitor configuration, in accordance with one or more aspects of this disclosure. Source device 202 and sink device 204 of system 200 of FIG. 2 may be configured to be examples of, and perform similar functions to, source device 102 and sink device 104 of system 100 of FIG. 1. Elements with common suffix numbers may be considered to perform similar functions. As one example, Rx coil 222 and rectifier 224 of WLC receiver 208 of FIG. 2 may perform similar functions as Rx coil 122 and rectifier 124 of WLC receiver 108 of FIG. 1. As another example, charger 210 and battery 212 may perform similar functions as charger 110 and battery 112 of FIG. 1. As another example, Tx coil 218 and inverter 216 of WLC transmitter 206 of FIG. 2 may perform similar functions as Tx coil 118 and inverter 116 of WLC transmitter 106 of FIG. 1.

One or both of TX coil 218 and/or RX coil 222 may include a split resonant capacitor configuration. As shown in FIG. 2, TX coil 218 may include a plurality of capacitors 230A-230N (collectively, "capacitors 230") and a plurality of coils 232A-232N (collectively, "coils 232"). Capacitors 230 and coils 232 may be arranged in a plurality of series pairs that are collectively in parallel. For instance, a first series pair may include capacitor 230A and coil 232A, a second series pair may include capacitor 230B and coil 232B, and an Nth series pair may include capacitor 230N and coil 232N. As can be seen in FIG. 2, the series pairs are all collectively in parallel. For instance, inputs to the series pairs may be connected to input node 242 and outputs from the series pairs may be connected to output node 244.

Similar to source device 102, source device 202 may include a driver circuit configured to drive the plurality of capacitor and wireless charging coil series pairs with a common signal. For instance, in the example of FIG. 2, the driver circuit may be represented by inverter 216. The driver circuit may output the common signal across a common input node and a common output node. For instance, as shown in FIG. 2, inverter 216 may output the common signal across input node 242 and output node 244.

Similar to above, sink device 204 may include a sink circuit configured to receive a common signal from the plurality of capacitor and wireless charging coil series pairs. For instance, in the example of FIG. 2, the sink circuit may be represented by rectifier 224. The sink circuit may receive the common signal across a common input node and a common output node. For instance, as shown in FIG. 2, rectifier 224 may receive the common signal from across input node 246 and output node 248.

As the series pairs are all collectively in parallel, respective voltages across the series pair may be equal. Additionally, in some examples, a respective amount of current flowing through each of the plurality of capacitor and wireless charging coil series pairs is approximately equal (e.g., within plus or minus 5%). For instance, each of the series pairs may have impedances that are approximately equal. As discussed above and in further detail below, a result of the respective amount of current flowing through each of the plurality of capacitor and wireless charging coil series pairs being approximately equal may reduce eddy current losses and improve charging efficiency.

As noted above, the split resonance capacitor configuration may be included in one or both of source device 202 and sink device 204. As can be seen in FIG. 2, RX coil 222 may include a plurality of capacitors 234A-234N (collectively, "capacitors 234") and a plurality of coils 236A-236N (collectively, "coils 236"). Capacitors 234 and coils 236 may be arranged in a plurality of series pairs that are collectively in parallel. For instance, a first series pair may include capacitor 234A and coil 236A, a second series pair may include capacitor 234B and coil 236B, and an Nth series pair may include capacitor 234N and coil 236N. For instance, inputs to the series pairs may be connected to input node 246 and outputs from the series pairs may be connected to output node 248.

As discussed above, WLC transmitter 206 may include coils 232 and WLC receiver 208 may include coils 236. Coils 232 and/or coils 236 may be referred to as wireless charging coils 232 and/or wireless charging coils 236. In some examples, one of more coils of wireless charging coils 232 and/or wireless charging coils 236 may comprise a respective bundle of wires. For instance, coil 232A may comprise a bundle of wires arranged in a coil configuration. In some examples, a bundle of wires may be a Litz wire. For instance, where coils 232 each comprise a respective bundle of wires, each of the respective bundles of wires may be a respective Litz wire. One example where the wireless charging coils comprise bundles of wires is discussed below with reference to FIG. 4. In some examples, one or more coils of wireless charging coils 232 and/or wireless charging coils 236 may comprise traces on a printed circuit board (PCB). In some examples, one or more coils of wireless charging coils 232 and/or wireless charging coils 236 may comprise copper trace wire.

In some examples, coils of a wireless transmitter or wireless receiver may be located on a discrete coil component. For instance, coils 232 may be located on a discrete component that is connected to other components of source device 202 (e.g., inverter 216 and capacitors 230) via ribbon cable or other electrical interconnections. As such, wireless charging coils of the plurality of capacitor and wireless charging coil series pairs may be located on a discrete coil component. In some of such examples, capacitors of the plurality of capacitor and wireless charging coil series pairs may be located on a board that is different than the discrete coil component. For instance, capacitors 230 may be located on a PCB that is different than the discrete coil component.

In some examples, capacitors of the plurality of capacitor and wireless charging coil series pairs are located on the discrete coil component. For instance, coils 232 and capacitors 230 may be located on a discrete component that is connected to other components of source device 202 (e.g., inverter 216) via ribbon cable or other electrical interconnections.

Figures 3, 4:
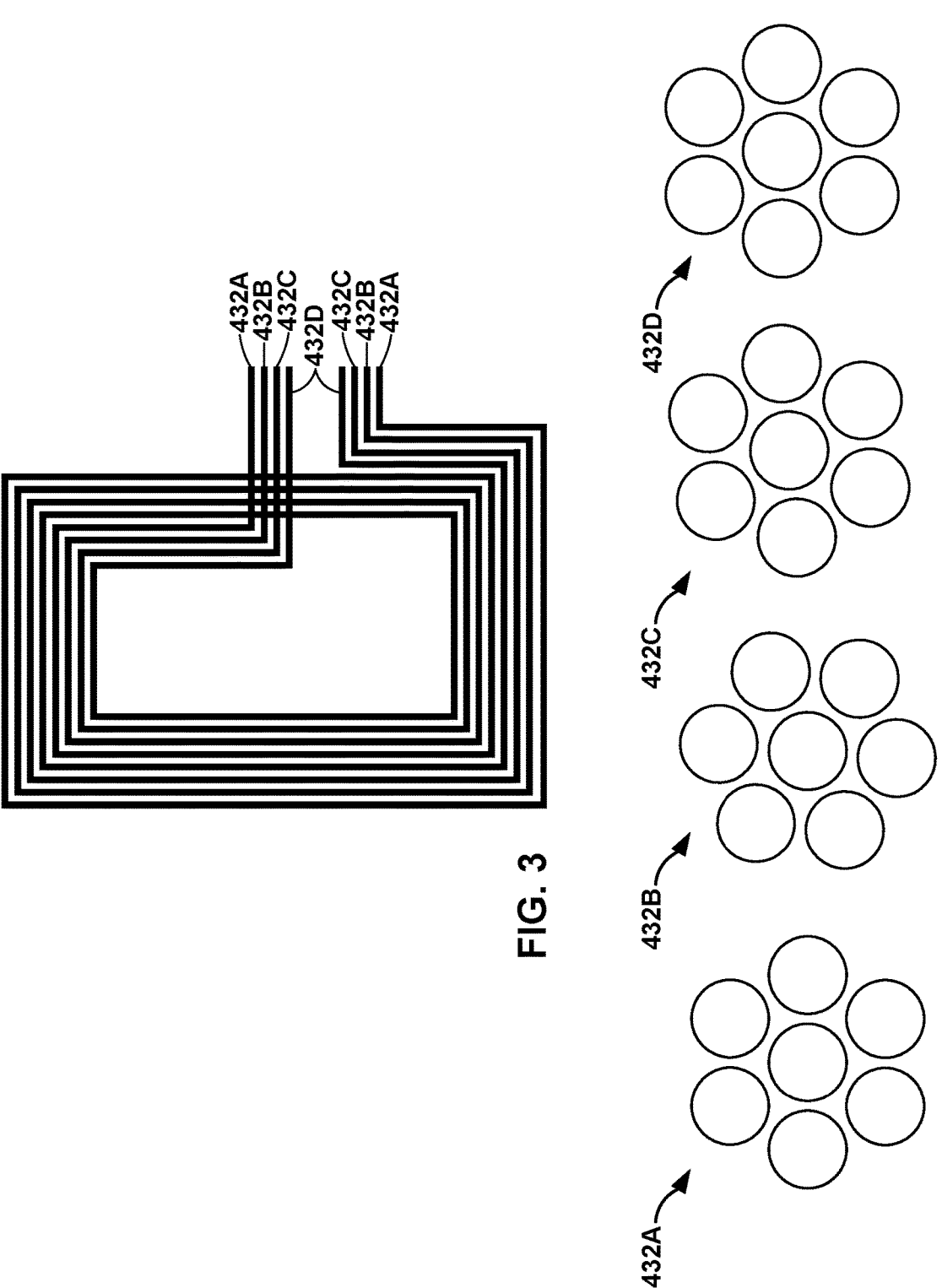
FIG. 3 is a conceptual diagram illustrating an example of a plurality of wireless charging coils, in accordance with one or more techniques of this disclosure.
FIG. 4 is a conceptual diagram illustrating a cross-section of a portion of wires of a plurality of wireless charging coils, in accordance with one or more aspects of this disclosure.

FIG. 3 is a conceptual diagram illustrating an example of a plurality of wireless charging coils, in accordance with one or more techniques of this disclosure. As shown in FIG. 3, a plurality of wireless charging coils (e.g., coils 232 or coils 236) may be formed of wires wound into a coil shape. As discussed above and in accordance with one or more aspects of this disclosure, a wireless charging coil may be placed in a split resonant capacitor configuration.

FIG. 4 is a conceptual diagram illustrating a cross-section of a portion of wires of a plurality of wireless charging coils, in accordance with one or more aspects of this disclosure. As discussed above, in some examples, each wireless charging coil may comprise a respective bundle of wires. As shown in FIG. 4, bundles 432A-432D may each represent a respective bundle of wires (e.g., each of the four bundles includes seven wires). As also discussed above, one benefit of the herein disclosed split resonant capacitor configuration is a reduction in eddy current in each wireless charging coil. This reduction may be achieved via improved AC current sharing between bundles.

Figure 5A:
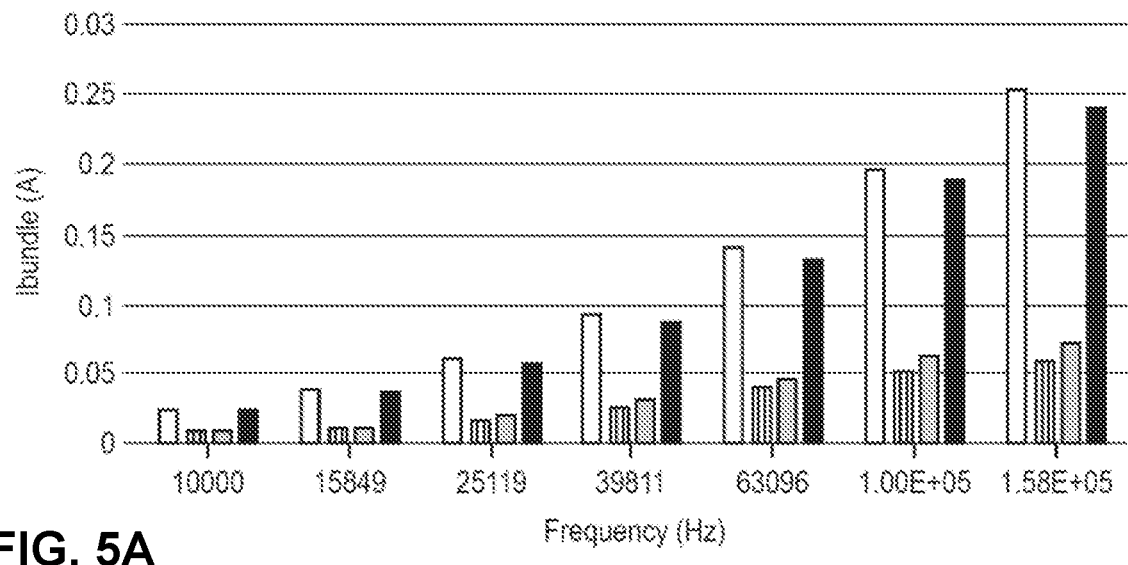
FIGS. 5A and 5B are graphs depicting currents flowing through wireless charging coils at various frequencies, in accordance with one or more aspects of this disclosure.
Figure 5B:
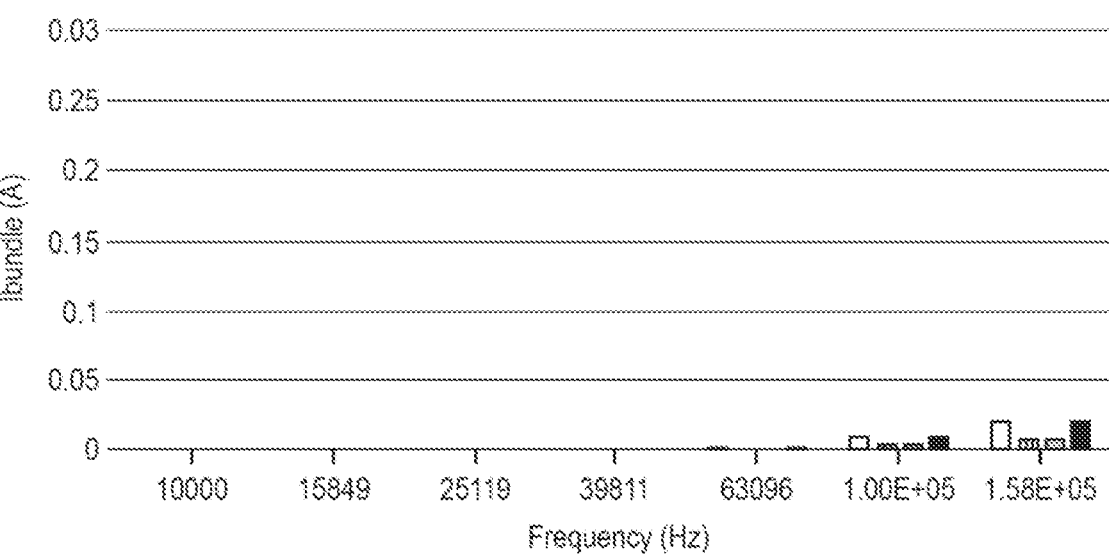

FIGS. 5A and 5B are graphs depicting currents flowing through wireless charging coils at various frequencies, in accordance with one or more aspects of this disclosure. FIG. 5A depicts currents of wireless charging coils in a non-split resonant capacitor configuration and FIG. 5B depicts currents of wireless charging coils in a split resonant capacitor configuration. As can be seen in FIGS. 5A and 5B, the use of a split resonant capacitor configuration yields significant reductions in currents at many frequencies. As noted above, such a reduction in eddy currents may improve wireless charging efficiency.

Figure 6A:
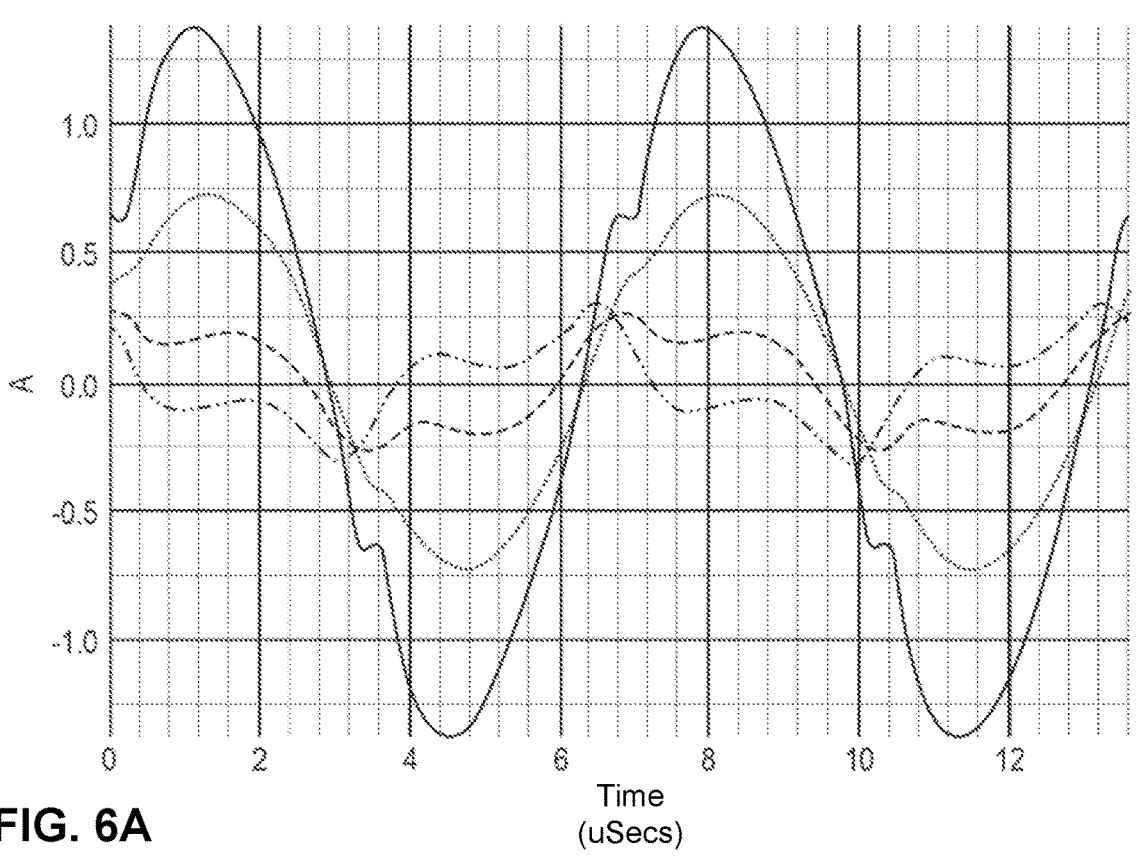
FIGS. 6A and 6B are graphs depicting currents flowing through wireless charging coils, in accordance with one or more aspects of this disclosure.
Figure 6B:
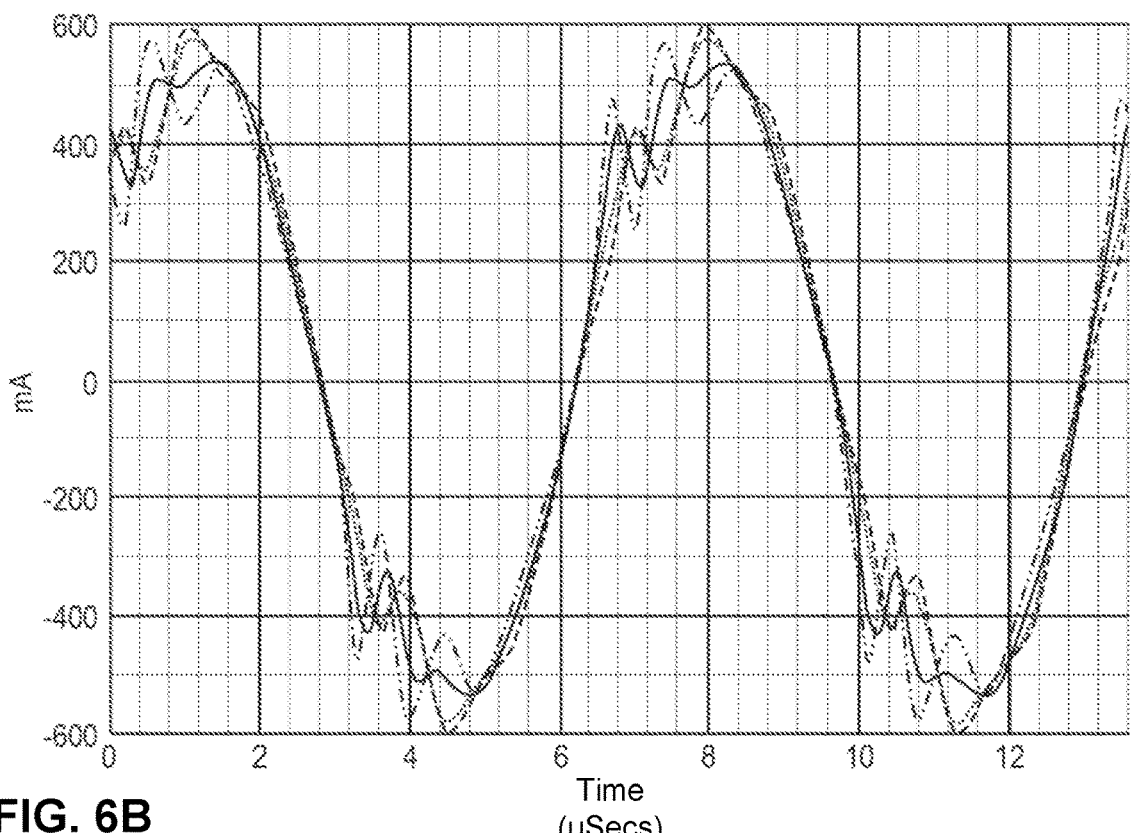

FIGS. 6A and 6B are graphs depicting currents flowing through wireless charging coils, in accordance with one or more aspects of this disclosure. FIG. 6A depicts currents of wireless charging coils in a non-split resonant capacitor configuration and FIG. 6B depicts currents of wireless charging coils in a split resonant capacitor configuration. As can be seen in FIGS. 6A and 6B, the use of a split resonant capacitor configuration yields significant reductions in currents. As noted above, such a reduction in currents may improve wireless charging efficiency.

Figure 7A:
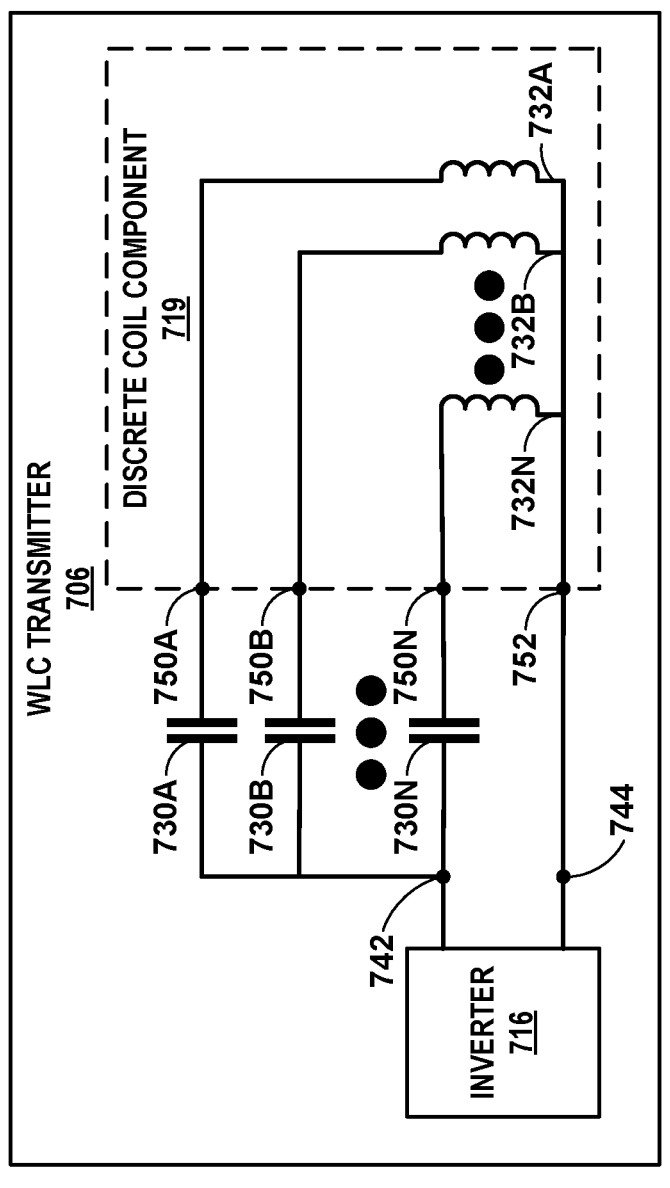
FIGS. 7A and 7B are schematic diagrams illustrating example implementations of the split resonant capacitor configuration in which resonant capacitors are not located on a discrete coil component, in accordance with one or more aspects of this disclosure.
Figure 7B:
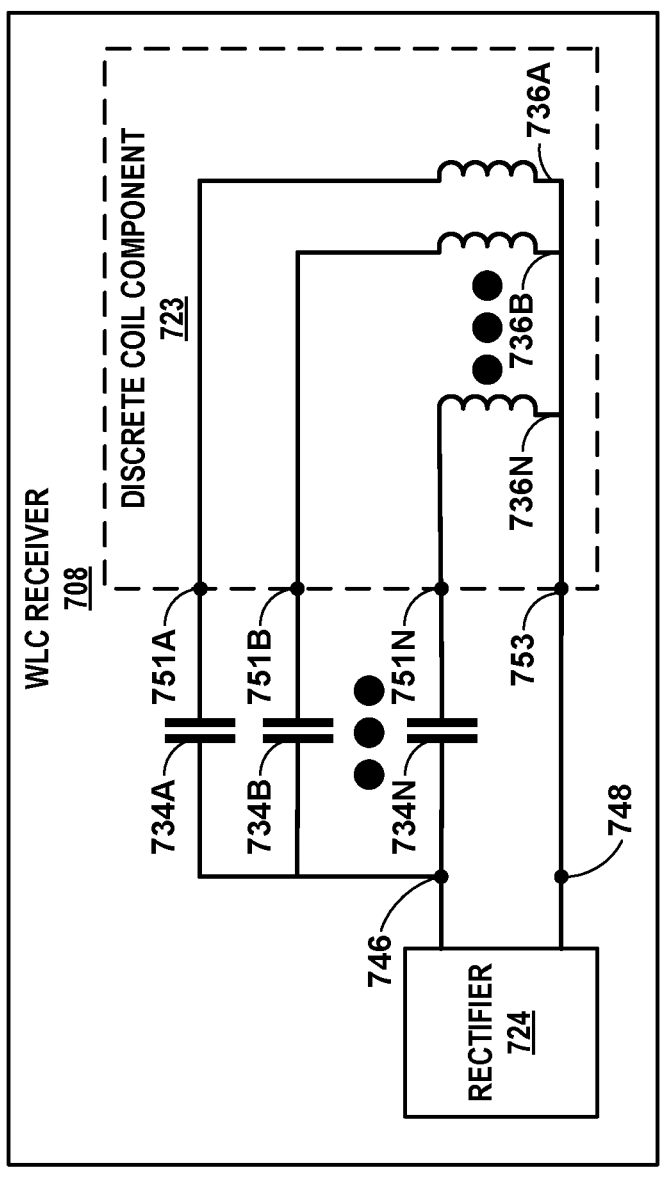

FIGS. 7A and 7B are schematic diagrams illustrating example implementations of the split resonant capacitor configuration in which resonant capacitors are not located on a discrete coil component, in accordance with one or more aspects of this disclosure. FIG. 7A illustrates an example implementation from the source device perspective while FIG. 7B illustrates an example implementation from the source device perspective.

WLC transmitter 706 of FIG. 7A may be considered to be an example of WLC transmitter 106 of FIG. 1 and WLC transmitter 206 of FIG. 2. Similarly, inverter 716, capacitors 730, coils 732, input node 742, and output node 744 may be considered examples of inverter 216, capacitors 230, coils 232, input node 242, and output node 244 of FIG. 2.

As shown in the example of FIG. 7A, coils 732 may be included on discrete coil component 719. However, in the example of FIG. 7A, capacitors 730 may not be located on discrete coil component 719. Discrete coil component 719 may be positioned co-planar with a housing, such as a rear housing of a device (e.g., a device that includes WLC transmitter 706). In general, discrete coil component 719 may be configured to perform operations similar to TX coil 218.

Discrete coil component 719 may be connected to other components of WLC transmitter 706 via at least N+1 connectors, where N is the quantity of resonant tanks. For instance, as shown in the example of FIG. 7A, discrete coil component 719 may include a separate connector for terminal within each resonant tank. For instance, discrete coil component 719 may include connector 750A for a first resonant tank formed from capacitor 730A and coil 732A, connector 750B for a second resonant tank formed from capacitor 730B and coil 732B may, and connector 750N for an Nth resonant tank formed from capacitor 730N and coil 732N. Connectors 750A-750N (collectively, "connectors 750") may be connected to capacitors 730 via any suitable technique (e.g., ribbon cable, wires, press contacts, etc.). Discrete coil component 719 may also include common connector 752. Connector 752 may be connected to output node 744 via any suitable technique (e.g., ribbon cable, wires, press contacts, etc.).

WLC receiver 708 of FIG. 7B may be considered to be an example of WLC receiver 108 of FIG. 1 and WLC receiver 208 of FIG. 2. Similarly, rectifier 724, capacitors 734, coils 736, input node 746, and output node 748 may be considered examples of rectifier 224, capacitors 234, coils 236, input node 246, and output node 248 of FIG. 2.

As shown in the example of FIG. 7B, coils 736 may be included on discrete coil component 723. However, in the example of FIG. 7B, capacitors 734 may not be located on discrete coil component 723. Discrete coil component 723 may be positioned co-planar with a housing, such as a rear housing of a device (e.g., a device that includes WLC receiver 708). In general, discrete coil component 723 may be configured to perform operations similar to RX coil 222.

Discrete coil component 723 may be connected to other components of WLC receiver 708 via at least N+1 connectors, where N is the quantity of resonant tanks. For instance, as shown in the example of FIG. 7B, discrete coil component 723 may include a separate connector for terminal within each resonant tank. For instance, discrete coil component 723 may include connector 751A for a first resonant tank formed from capacitor 734A and coil 736A, connector 751B for a second resonant tank formed from capacitor 734B and coil 736B may, and connector 751N for an Nth resonant tank formed from capacitor 734N and coil 736N. Connectors 751A-751N (collectively, "connectors 751") may be connected to capacitors 734 via any suitable technique (e.g., ribbon cable, wires, press contacts, etc.). Discrete coil component 723 may also include common connector 753. Connector 753 may be connected to output node 748 via any suitable technique (e.g., ribbon cable, wires, press contacts, etc.).

Figure 8A:
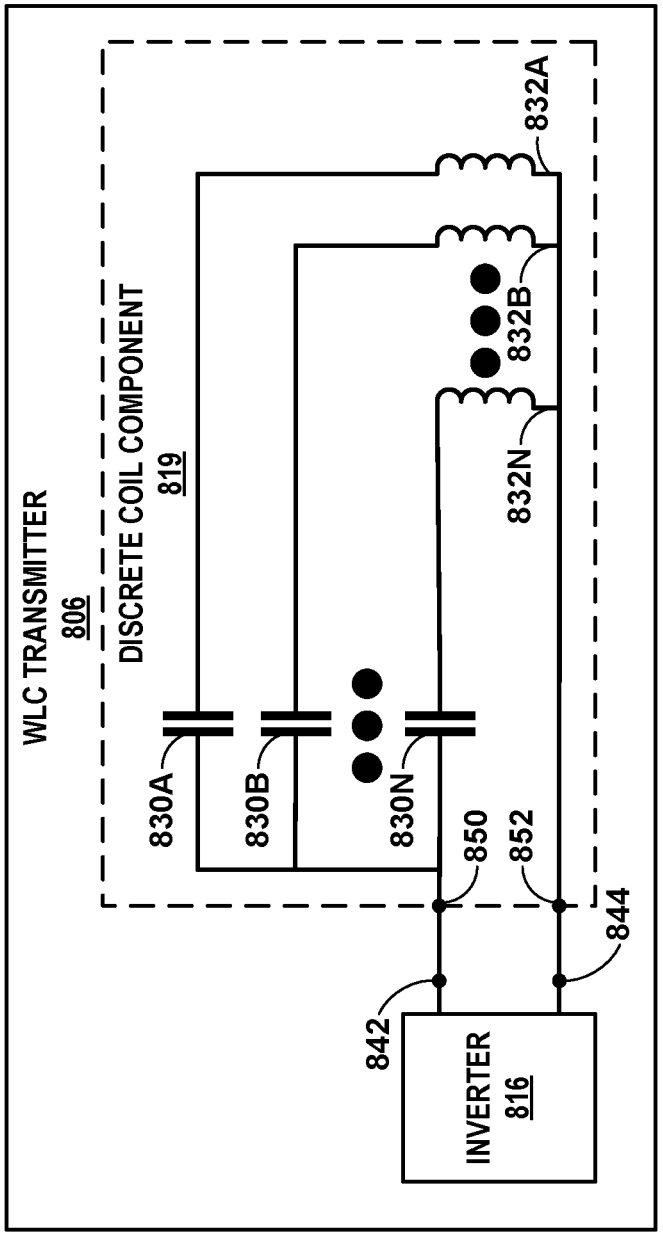
FIGS. 8A and 8B are schematic diagrams illustrating example implementations of the split resonant capacitor configuration in which resonant capacitors are located on a discrete coil component, in accordance with one or more aspects of this disclosure.
Figure 8B:
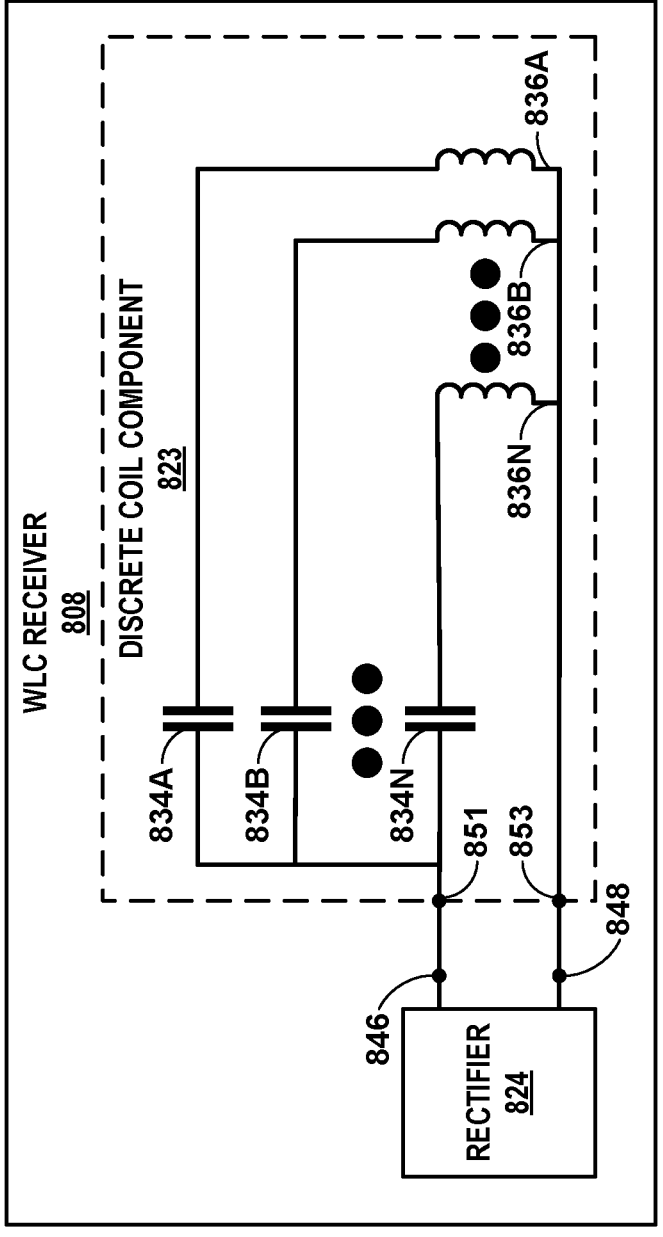

FIGS. 8A and 8B are schematic diagrams illustrating example implementations of the split resonant capacitor configuration in which resonant capacitors are located on a discrete coil component, in accordance with one or more aspects of this disclosure. FIG. 8A illustrates an example implementation from the source device perspective while FIG. 8B illustrates an example implementation from the source device perspective.

WLC transmitter 806 of FIG. 8A may be considered to be an example of WLC transmitter 106 of FIG. 1 and WLC transmitter 206 of FIG. 2. Similarly, inverter 816, capacitors 830, coils 832, input node 842, and output node 844 may be considered examples of inverter 216, capacitors 230, coils 232, input node 242, and output node 244 of FIG. 2.

As shown in the example of FIG. 8A, both coils 832 and capacitors 830 may be included on discrete coil component 819. Discrete coil component 819 may be positioned co-planar with a housing, such as a rear housing of a device.

Discrete coil component 819 may be connected to other components of WLC transmitter 806 via at least two connectors. For instance, as shown in the example of FIG. 8A, discrete coil component 819 may include an input connector 850 and an output connector 852. Connector 850 may be connected to input node 842 via any suitable technique (e.g., ribbon cable, wires, press contacts, etc.). Similarly, connector 852 may be connected to output node 844 via any suitable technique (e.g., ribbon cable, wires, press contacts, etc.).

WLC receiver 808 of FIG. 8B may be considered to be an example of WLC receiver 108 of FIG. 1 and WLC receiver 208 of FIG. 2. Similarly, rectifier 823, capacitors 834, coils 836, input node 846, and output node 848 may be considered examples of rectifier 224 capacitors 234, coils 236, input node 246, and output node 248 of FIG. 2.

As shown in the example of FIG. 8B, both coils 834 and capacitors 836 may be included on discrete coil component 823. Discrete coil component 823 may be positioned co-planar with a housing, such as a rear housing of a device.

Discrete coil component 823 may be connected to other components of WLC receiver 808 via at least two connectors. For instance, as shown in the example of FIG. 8B, discrete coil component 823 may include an input connector 851 and an output connector 853. Connector 851 may be connected to input node 846 via any suitable technique (e.g., ribbon cable, wires, press contacts, etc.). Similarly, connector 854 may be connected to output node 848 via any suitable technique (e.g., ribbon cable, wires, press contacts, etc.).

Figure 9A:
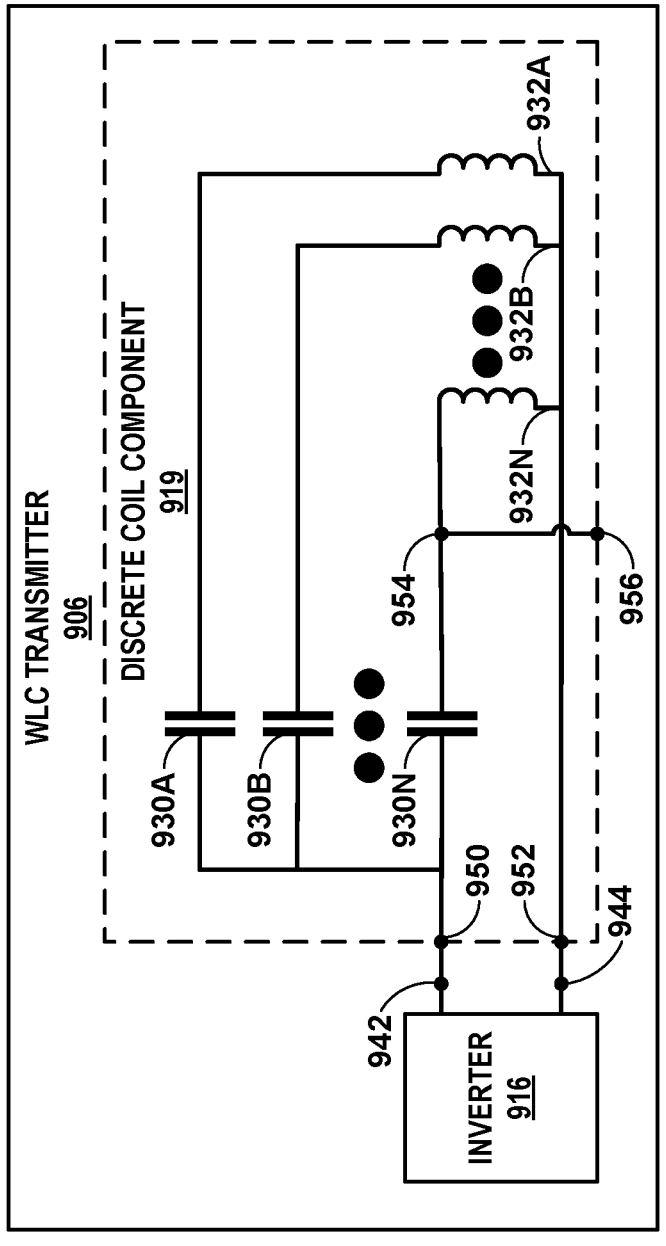
FIGS. 9A and 9B are schematic diagrams illustrating example implementations of the split resonant capacitor configuration in which resonant capacitors are located on a discrete coil component, in accordance with one or more aspects of this disclosure.
Figure 9B:
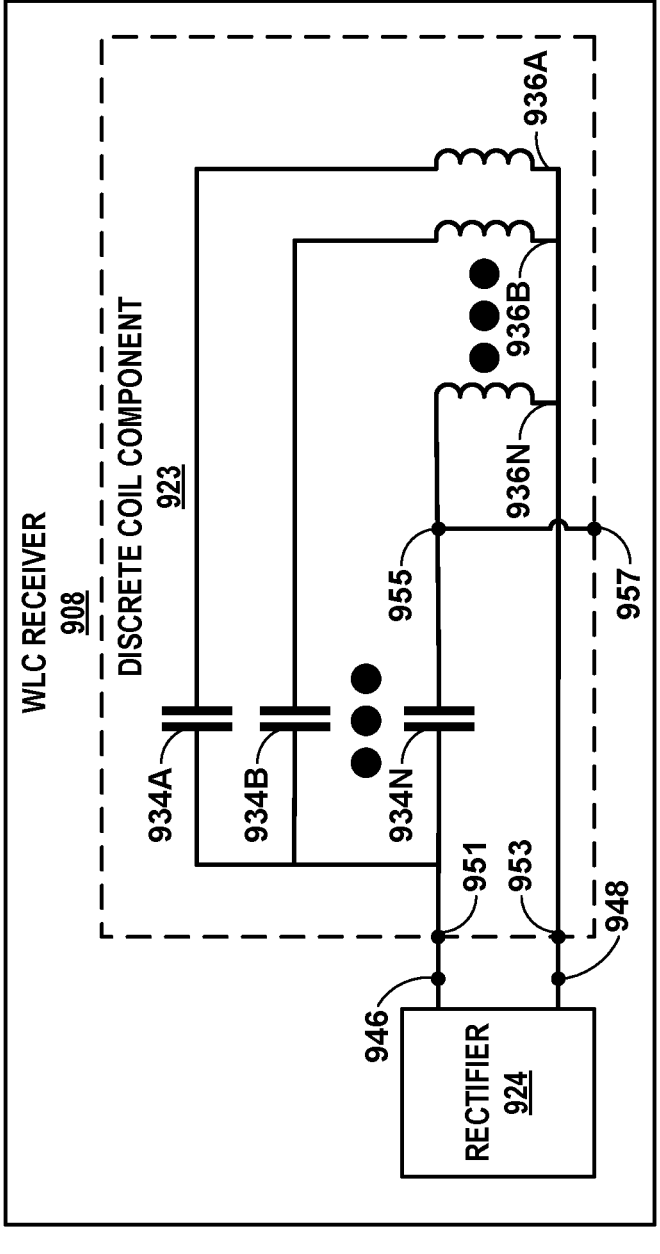

FIGS. 9A and 9B are schematic diagrams illustrating example implementations of the split resonant capacitor configuration in which resonant capacitors are located on a discrete coil component, in accordance with one or more aspects of this disclosure. FIG. 8A illustrates an example implementation from the source device perspective while FIG. 8B illustrates an example implementation from the source device perspective.

WLC transmitter 906 of FIG. 9A may be considered to be an example of WLC transmitter 106 of FIG. 1 and WLC transmitter 206 of FIG. 2. Similarly, inverter 916, capacitors 930, coils 932, input node 942, and output node 944 may be considered examples of inverter 216, capacitors 230, coils 232, input node 242, and output node 244 of FIG. 2.

As shown in the example of FIG. 9A, both coils 932 and capacitors 930 may be included on discrete coil component 919. Discrete coil component 919 may be positioned coplanar with a housing, such as a rear housing of a device.

Discrete coil component 919 may be connected to other components of WLC transmitter 906 via at least two connectors. For instance, as shown in the example of FIG. 9A, discrete coil component 919 may include an input connector 950 and an output connector 952. Connector 950 may be connected to input node 942 via any suitable technique (e.g., ribbon cable, wires, press contacts, etc.). Similarly, connector 952 may be connected to output node 944 via any suitable technique (e.g., ribbon cable, wires, press contacts, etc.).

As also shown in FIG. 9A, a subset of the resonant tanks may include an intermediate node that may be accessible to components external to discrete coil component 919. For instance, while a first resonant tank formed from capacitor 930A and coil 932A and a second resonant tank formed from capacitor 930B and coil 932B may not include intermediate node, an Nth resonant tank formed from capacitor 930N and coil 932N may include node 954. Node 954 may be connected to a component (e.g., to sense attributes of electrical signals flowing through the Nth resonant tank). As shown in FIG. 9A, discrete coil component 919 may include an additional connector (i.e., connector 956) via which node 954 may be accessed. In some examples, one or more components may utilize signals sensed via 954 to control one or more parameters of the wireless charging (e.g., a current or voltage level of an electrical signal provided to, or output by, inverter 916).

WLC receiver 908 of FIG. 9B may be considered to be an example of WLC receiver 108 of FIG. 1 and WLC receiver 208 of FIG. 2. Similarly, rectifier 924, capacitors 934, coils 936, input node 946, and output node 948 may be considered examples of rectifier 224, capacitors 234, coils 236, input node 246, and output node 248 of FIG. 2.

As shown in the example of FIG. 9B, both coils 936 and capacitors 934 may be included on discrete coil component 923. Discrete coil component 919 may be positioned coplanar with a housing, such as a rear housing of a device.

Discrete coil component 923 may be connected to other components of WLC receiver 908 via at least two connectors. For instance, as shown in the example of FIG. 9B, discrete coil component 923 may include an input connector 951 and an output connector 953. Connector 951 may be connected to input node 946 via any suitable technique (e.g., ribbon cable, wires, press contacts, etc.). Similarly, connector 953 may be connected to output node 948 via any suitable technique (e.g., ribbon cable, wires, press contacts, etc.).

As also shown in FIG. 9B, a subset of the resonant tanks may include an intermediate node that may be accessible to components external to discrete coil component 923. For instance, while a first resonant tank formed from capacitor 934A and coil 936A and a second resonant tank formed from capacitor 934B and coil 936B may not include intermediate node, an Nth resonant tank formed from capacitor 934N and coil 936N may include node 955. Node 955 may be connected to a component (e.g., to sense attributes of electrical signals flowing through the Nth resonant tank). As shown in FIG. 9B, discrete coil component 923 may include an additional connector (i.e., connector 957) via which node 955 may be accessed. In some examples, one or more components may utilize signals sensed via 955 to control one or more parameters of the wireless charging (e.g., a current or voltage level of an electrical signal output by rectifier 924).

While a number of varied configurations have been described, it may not be necessary for a wireless charging source device (e.g., a device that include a WLC transmitter) and a wireless charging sink device (e.g., a device that includes a WLC receiver) in a system to have the same configuration. For instance, a wireless charging source device having a non-split resonant capacitor configuration may be used to wirelessly provide power to a wireless charging sink device having a split resonant capacitor configuration and vice versa.

The following numbered examples may illustrate one or more aspects of this disclosure:

Example 1. A wireless charging device comprising: a plurality of capacitor and wireless charging coil series pairs that are collectively in parallel; and one or both of: a driver circuit configured to drive the plurality of capacitor and wireless charging coil series pairs with a first common signal; or a sink circuit configured to receive a second common signal from the plurality of capacitor and wireless charging coil series pairs.

Example 2. The wireless charging device of example 1, wherein each of the wireless charging coils comprises a respective bundle of wires.

Example 3. The wireless charging device of example 2, wherein each of the respective bundles of wires comprises one of: a respective Litz wire; or a respective trace wire.

Example 4. The wireless charging device of example 1, wherein a respective amount of current flowing through each of the plurality of capacitor and wireless charging coil series pairs is approximately equal.

Example 5. The wireless charging device of example 1, wherein wireless charging coils of the plurality of capacitor and wireless charging coil series pairs are located on a discrete coil component.

Example 6. The wireless charging device of example 5, wherein capacitors of the plurality of capacitor and wireless charging coil series pairs are located on the discrete coil component.

Example 7. The wireless charging device of example 5, wherein capacitors of the plurality of capacitor and wireless charging coil series pairs are located on a board that is different than the discrete coil component.

Example 8. The wireless charging device of example 1, wherein the wireless charging device comprises a wireless charging source device, and wherein the driver circuit comprises an inverter.

Example 9. The wireless charging device of example 1, wherein the wireless charging device comprises a wireless charging sink device, and wherein the sink circuit comprises a rectifier.

Example 10. A system comprising: a wireless charging source device; and a wireless charging sink device, wherein the wireless charging source device is configured to wirelessly charge the wireless charging sink device, and wherein the wireless charging source device comprises: a plurality of capacitor and wireless charging coil series pairs that are collectively in parallel; and a driver circuit configured to drive the plurality of capacitor and wireless charging coil series pairs with a common signal.

Example 11. A system comprising: a wireless charging source device; and a wireless charging sink device, wherein the wireless charging source device is configured to wirelessly charge the wireless charging sink device, and wherein the wireless charging sink device comprises: a plurality of capacitor and wireless charging coil series pairs that are collectively in parallel; and a sink circuit configured to receive a common signal from the plurality of capacitor and wireless charging coil series pairs.

Various aspects have been described in this disclosure. These and other aspects are within the scope of the following claims.

What is claimed is:

1. A wireless charging sink device comprising:
a plurality of capacitor and wireless charging coil series pairs that are collectively in parallel; and
a sink circuit configured to receive a second common signal from the plurality of capacitor and wireless charging coil series pairs.

2. The wireless charging sink device of claim 1, wherein each of the wireless charging coils comprises a respective bundle of wires.

3. The wireless charging sink device of claim 2, wherein each of the respective bundles of wires comprises one of:
a respective Litz wire; or
a respective trace wire.

4. The wireless charging sink device of claim 1, wherein a respective amount of current flowing through each of the plurality of capacitor and wireless charging coil series pairs is approximately equal.

5. The wireless charging sink device of claim 1, wherein wireless charging coils of the plurality of capacitor and wireless charging coil series pairs are located on a discrete coil component.

6. The wireless charging sink device of claim 5, wherein capacitors of the plurality of capacitor and wireless charging coil series pairs are located on the discrete coil component.

7. The wireless charging sink device of claim 5, wherein capacitors of the plurality of capacitor and wireless charging coil series pairs are located on a board that is different than the discrete coil component.

8. The wireless charging sink device of claim 1, wherein the sink circuit comprises a rectifier.

9. A system comprising:
a wireless charging source device; and
a wireless charging sink device, wherein the wireless charging source device is configured to wirelessly charge the wireless charging sink device, and wherein the wireless charging sink device comprises:
a plurality of capacitor and wireless charging coil series pairs that are collectively in parallel; and
a sink circuit configured to receive a common signal from the plurality of capacitor and wireless charging coil series pairs.

* * * * *